(12) United States Patent
Ho et al.

(10) Patent No.: US 9,665,926 B2
(45) Date of Patent: May 30, 2017

(54) METHOD FOR OBJECT DISPLAYING AND ELECTRONIC DEVICE THEREOF

(71) Applicant: Samsung Electronics Co., Ltd., Gyeonggi-do (KR)

(72) Inventors: Jong-Hyun Ho, Seoul (KR); Sin-Jae Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/699,562

(22) Filed: Apr. 29, 2015

(65) Prior Publication Data

US 2015/0310587 A1    Oct. 29, 2015

(30) Foreign Application Priority Data

Apr. 29, 2014 (KR) .................. 10-2014-0051252

(51) Int. Cl.
  *G09G 5/00*  (2006.01)
  *G06T 3/40*  (2006.01)
  *G06F 3/0481*  (2013.01)

(52) U.S. Cl.
  CPC .............. *G06T 3/40* (2013.01); *G06F 3/0481* (2013.01); *G06F 3/04817* (2013.01); *G06T 2210/44* (2013.01)

(58) Field of Classification Search
  None
  See application file for complete search history.

(56) References Cited

U.S. PATENT DOCUMENTS

| 7,345,675 | B1 | 3/2008 | Minakuchi et al. | |
|---|---|---|---|---|
| 2004/0100479 | A1 | 5/2004 | Nakano et al. | |
| 2012/0084730 | A1 | 4/2012 | Noma et al. | |
| 2012/0233565 | A1 | 9/2012 | Grant | |
| 2013/0120462 | A1* | 5/2013 | Shuler | G06F 3/1423 345/660 |
| 2014/0176600 | A1* | 6/2014 | Lee | G09B 21/008 345/625 |

FOREIGN PATENT DOCUMENTS

FR    2956545    8/2011

OTHER PUBLICATIONS

European Search Report dated Sep. 25, 2015 issued in counterpart application No. 15165720.2-1972, 8 pages.

* cited by examiner

*Primary Examiner* — Martin Mushambo
(74) *Attorney, Agent, or Firm* — The Farrell Law Firm, P.C.

(57) ABSTRACT

An electronic device that uses a method of displaying an object by the electronic device is provided. The method includes identifying one or more objects for displaying in a display area of the electronic device and, when at least one of the one or more objects cannot be displayed in the display area, changing display attributes of the one or more objects and displaying the objects in the display area.

15 Claims, 16 Drawing Sheets

FIG.7A

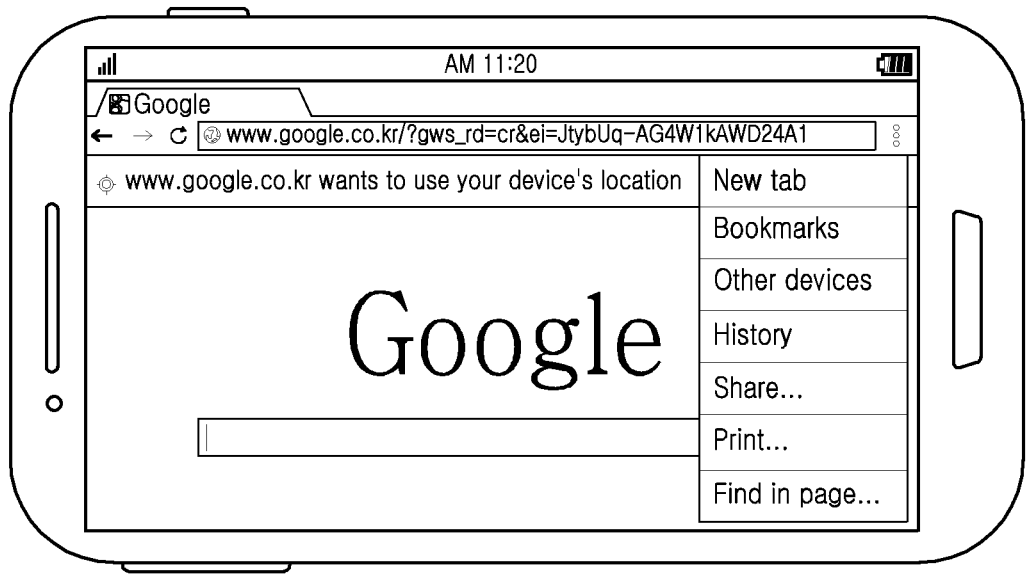
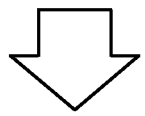
FIG.10B
FIG.10A

FIG.10A
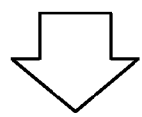
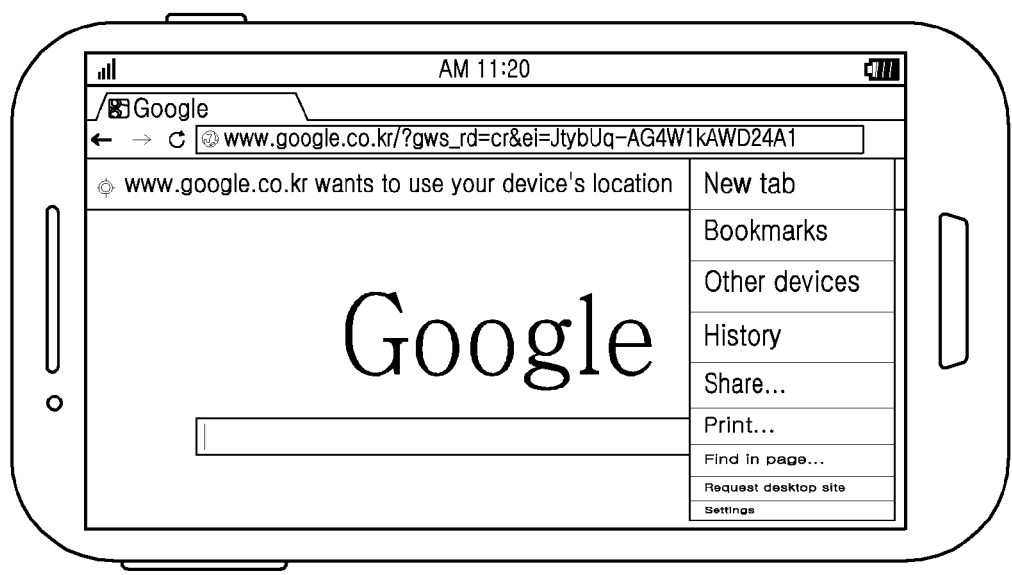
FIG.10B

METHOD FOR OBJECT DISPLAYING AND ELECTRONIC DEVICE THEREOF

PRIORITY

This application claims priority under 35 U.S.C. §119(a) to Korean Patent Application Serial No. 10-2014-0051252, which was filed in the Korean Intellectual Property Office on Apr. 29, 2014, the entire content of which is incorporated herein by reference.

BACKGROUND OF THE INVENTION

1. Field of the Invention

The present invention relates to a method and an apparatus for controlling a display of an object in an electronic device, and more particularly, to an electronic device that uses a method that includes, when at least one of one or more objects cannot be displayed in a display area of the electronic device, changing display attributes of the one or more objects and displaying the one or more objects in the display area.

2. Description of the Related Art

Electronic devices, which have become modern necessities due in part to their high portability, have been developed as multimedia devices that provide various services such as voice and video call functions, an information input/output function, and data transmission/reception.

As electronic devices provide multimedia services as described above, information which should be processed by the electronic device and information which should be displayed by the electronic device have increased. At this time, the electronic device may display a limited amount of information according to the size of a display unit.

When a website address is input into an address bar in an Internet application program, an electronic device displays content of an address having a reference length or longer by using ellipsis ( . . . ), omission, and gradation, which may inconvenience a user in performing a separate control in order to identify content of the address, which is not displayed in the address bar.

SUMMARY OF THE INVENTION

The present invention has been made to address at least the above mentioned problems and/or disadvantages and to provide at least the advantages described below.

Accordingly, an aspect of the present invention provides an electronic device that uses a method for identifying one or more objects which should be displayed in a display area.

Another aspect of the present invention provides an electronic device that uses a method for identifying at least some objects which should be displayed in the display area but are not displayed in the display area.

Another aspect of the present invention provides an electronic device that uses a method for changing display attributes of at least some objects which are not displayed in the display area.

Another aspect of the present invention provides an electronic device that uses a method for changing display attributes of at least some objects which are displayed in the display area.

In accordance with an aspect of the present invention, a method of displaying an object by an electronic device is provided. The method includes identifying one or more objects which should be displayed in a display area of the electronic device and, when at least one of the one or more objects cannot be displayed in the display area, changing display attributes of the one or more objects and displaying the one or more objects in the display area.

In accordance with another aspect of the present invention, an electronic device for displaying an object is provided. The electronic device includes one or more processors configured to identify one or more objects which should be displayed in a display area, and change display attributes of the one or more objects and display the one or more objects in the display area when at least one of the one or more objects cannot be displayed in the display area.

In accordance with another aspect of the present invention, a nontransitory computer-readable recording medium for storing commands and recording a program for executing operations is provided. The operations includes identifying one or more objects which should be displayed in a display area of the electronic device, and, when at least one of the one or more objects cannot be displayed in the display area, changing display attributes of the one or more objects and displaying the one or more objects in the display area.

BRIEF DESCRIPTION OF THE DRAWINGS

The above and other aspects, features, and advantages of the present invention will be more apparent from the following detailed description taken in conjunction with the accompanying drawings, in which:

FIGS. 5A-10B illustrate screen configurations in which an electronic device converts display attributes of objects and displays the objects, according to an embodiment of the present invention.

DETAILED DESCRIPTION OF EMBODIMENTS OF THE PRESENT INVENTION

Hereinafter, embodiments of the present invention are described in detail with reference to the accompanying drawings. Those of ordinary skill in the art will recognize that various changes and modifications of the embodiments described herein can be made without departing from the scope of the present invention. In addition, descriptions of well-known functions and constructions may be omitted for clarity and conciseness. The same reference symbols are used throughout the drawings to refer to the same or like parts.

In the following description, an electronic device may include a mobile communication terminal, a Personal Digital Assistant (PDA), a laptop, a smart phone, a netbook, a television, a Mobile Internet Device (MID), a Ultra Mobile Personal Computer (UMPC), a tablet PC, a navigation device, a digital refrigerator, a digital watch, and an MP3 player.

In the following description, an object may include all objects such as images or text which can be displayed on a display unit.

Figure 1:
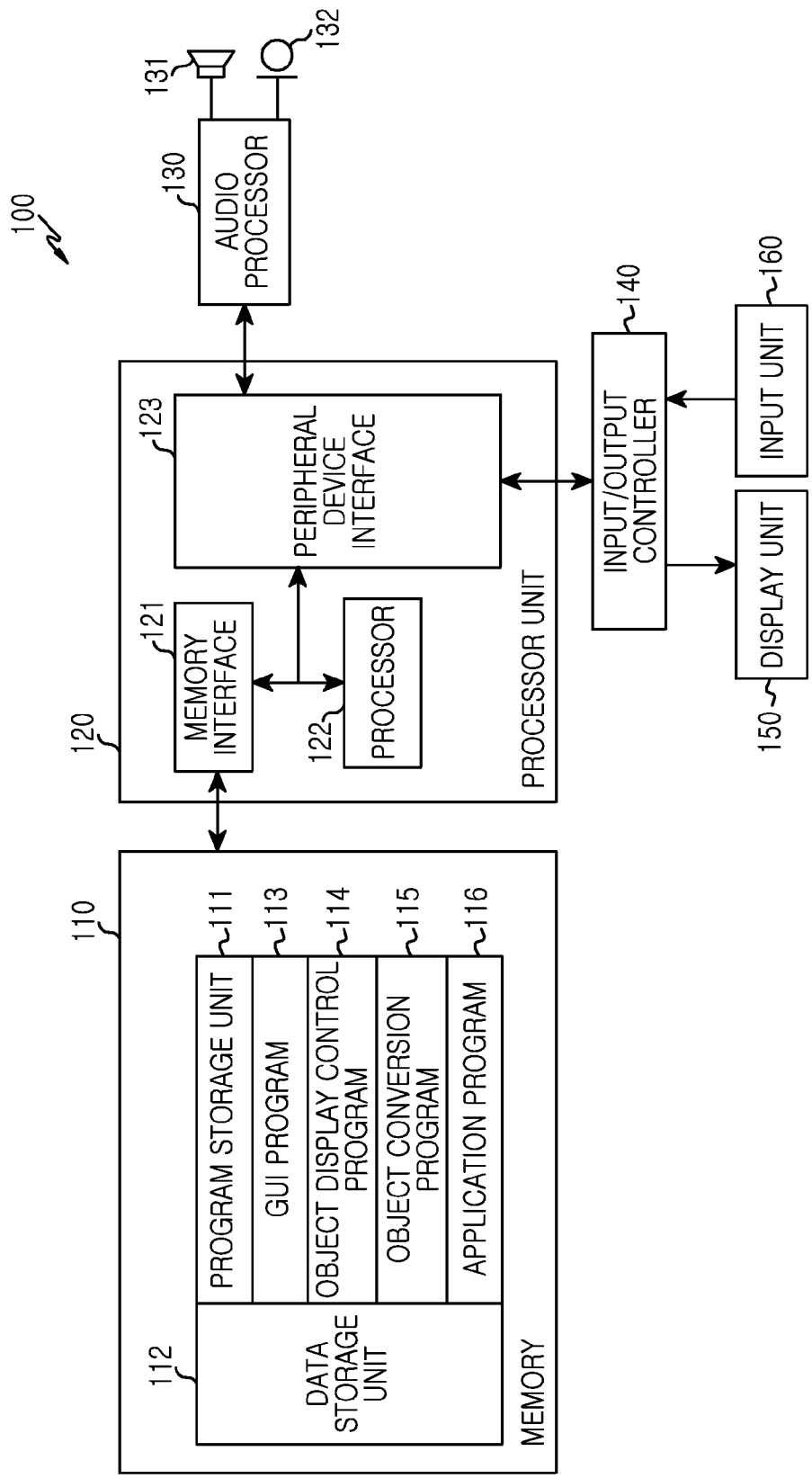
FIG. 1 is a block diagram of an electronic device, according to an embodiment of the present invention.

FIG. 1 is a block diagram of an electronic device 100, according to an embodiment of the present invention.

As illustrated in FIG. 1, the electronic device 100 includes a memory 110, a processor unit 120, an audio processor 130, an input/output controller 140, a display unit 150, and an input unit 160. There can be more than one memory 110.

The memory 110 includes a program storage unit 111 which stores a program for controlling an operation of the electronic device 100 and a data storage unit 112 which stores data generated while the program is executed. The program storage unit 111 includes a Graphic User Interface (GUI) program 113, an object display control program 114, an object conversion program 115, and at least one application program 116. Programs included in the program storage unit 111 may be expressed as an instruction set which is a set of instructions.

The GUI program 113 includes at least one software component for graphically providing a user interface to the display unit 150. For example, the GUI program 113 may make a control to display application program information executed by the processor 122 on the display unit 150.

The object display control program 114 includes at least one software component for identifying whether at least some objects which are not displayed in a display area exist.

Further, the object display control program 114 includes at least one software component for identifying directions of at least some objects which are not displayed in a display area.

The object conversion program 115 includes at least one software component for converting display attributes of the object. The object conversion program 115 includes at least one software component for converting display attributes of at least some objects which are not displayed. The object conversion program 115 includes at least one software component for converting display attributes of at least some objects which are displayed. The object conversion program 115 includes at least one software component for converting display attributes of at least some objects which are not displayed and at least some objects which are displayed.

The object conversion program 115 may be included in the object display control program 114. Further, at least one of the object conversion program 115 and the object display control program 114 may be included in the GUI program 113.

The application program 116 includes a software component for at least one application program installed in the electronic device 100.

The processor unit 120 includes a memory interface 121, at least one processor 122, and a peripheral device interface 123. The memory interface 121, the at least one processor 122, and the peripheral device interface 123 included in the processor unit 120 may be integrated into at least one integrated circuit or may be implemented as separate components.

The memory interface 121 controls access of components such as the processor 122 or the peripheral device interface 123 to the memory 110.

The peripheral device interface 123 controls a connection between an input/output peripheral device of the electronic device 100 and the processor 122 and a connection between the input/output peripheral device of the electronic device 100 and the memory interface 121.

Figure 2:
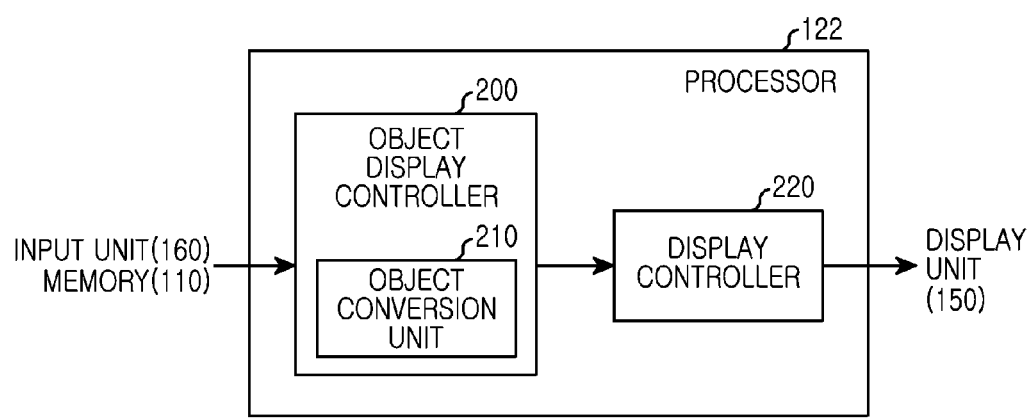
FIG. 2 is a block diagram illustrating a processor, according to an embodiment of the present invention.

The processor 122 controls the electronic device 100 to provide various services by using at least one software program. The processor 122 executes at least one program stored in the memory 110 to provide a service corresponding to the corresponding program. For example, the processor 122 may be configured as illustrated in FIG. 2 to identify whether at least some objects which are not displayed in a display area exist, and to identify directions of at least some objects which are not displayed in the display area by executing the object display control program 114 and may convert display attributes of objects by executing the object conversion program 115.

The audio processor 130 provides an audio interface between the user and the electronic device 100 through a speaker 131 and a microphone 132.

The input/output controller 140 provides an interface between an input/output device, such as the display unit 150 and the input/output unit 160, and the peripheral device interface 123.

The display unit 150 displays status information of the electronic device 100, characters input by the user, a moving picture, and a still picture. For example, the display unit 150 displays application program information executed by the processor 122. The display unit 150 may also display at least one object according to the GUI program 113.

The input unit 160 provides input data generated by a user's selection to the processor unit 120 through the input/output controller 140.

Additionally, the electronic device 100 may include a communication unit for performing voice communication and data communication. The communication unit may be divided into a plurality of communication sub modules for supporting different communication networks. For example, communication networks may include a Global System for Mobile communication (GSM) network, an Enhanced data GSM Environment (EDGE) network, a Code Division Multiple Access (CDMA) network, a Wideband Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, and Near Field Communication (NFC), but are not limited thereto.

FIG. 2 is a block diagram illustrating the processor 122, according to an embodiment of the present invention.

As illustrated in FIG. 2, the processor 122 includes an object display controller 200, an object conversion unit 210, and a display controller 220.

The object display controller 200 identifies whether at least some objects which are not displayed in a display area exist by executing the object display control program 114 of the program storage unit 111.

Further, the object display controller 200 identifies directions of at least some objects which are not displayed in the display area by executing the object display control program 114 of the program storage unit 111.

The object conversion unit 210 converts display attributes of objects by executing the object conversion program 115 of the program storage unit 111. The object conversion unit 210 includes at least one software component for converting display attributes of at least some objects which are not displayed. The object conversion unit 210 includes at least one software component for converting display attributes of at least some objects which are displayed. The object conversion program 210 includes at least one software component for converting display attributes of at least some objects which are not displayed and at least some objects which are displayed.

The display controller 220 displays an object transmitted from the object display controller 200 or the object conversion unit 210 on the display unit 150 by executing the GUI program 113 of the program storage unit 111.

The object conversion unit 210 may be included in the object display controller 200 or configured as a separate processor. Further, at least one of the object display controller 200 and the object conversion unit 210 may be included in the display controller 220.

In accordance with the embodiments of the present invention, the processor 122 is configured to identify one or more objects which should be displayed in a display area of the display unit 150 and change display attributes of the one or more objects and display the objects in the display area when at least some of the one or more objects cannot be displayed in the display area.

The processor 122 displays at least some of the one or more objects in a curved manner.

The processor 122 displays at least some of the one or more objects that are curved based on at least one method of perspective projection and orthographic projection.

The processor 122 applies a shade to the displayed one or more objects that are curved based on a displayed curved angle.

When the one or more objects displayed correspond to text, the processor 122 changes at least one of a size, interval, and width of the text.

The processor 122 identifies directions of at least some of the one or more objects which are not displayed in the display area and changes display attributes of the one or more objects based on the identified directions.

The processor 122 changes display attributes of the one or more objects which are displayed in the display area.

The processor 122 changes display attributes of at least some of the one or more objects which are not displayed in the display area.

Figure 3:
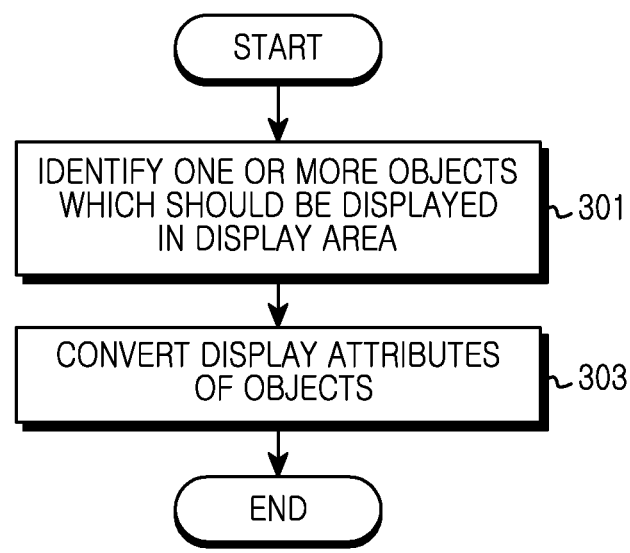
FIG. 3 is a flowchart illustrating a process for converting display attributes of objects when at least some objects, which are not displayed in a display area of an electronic device, exist, according to an embodiment of the present invention.

FIG. 3 is a flowchart illustrating a process for converting display attributes of objects when at least some objects which are not displayed in a display area of the electronic device exist, according to an embodiment of the present invention.

Figure 5A:
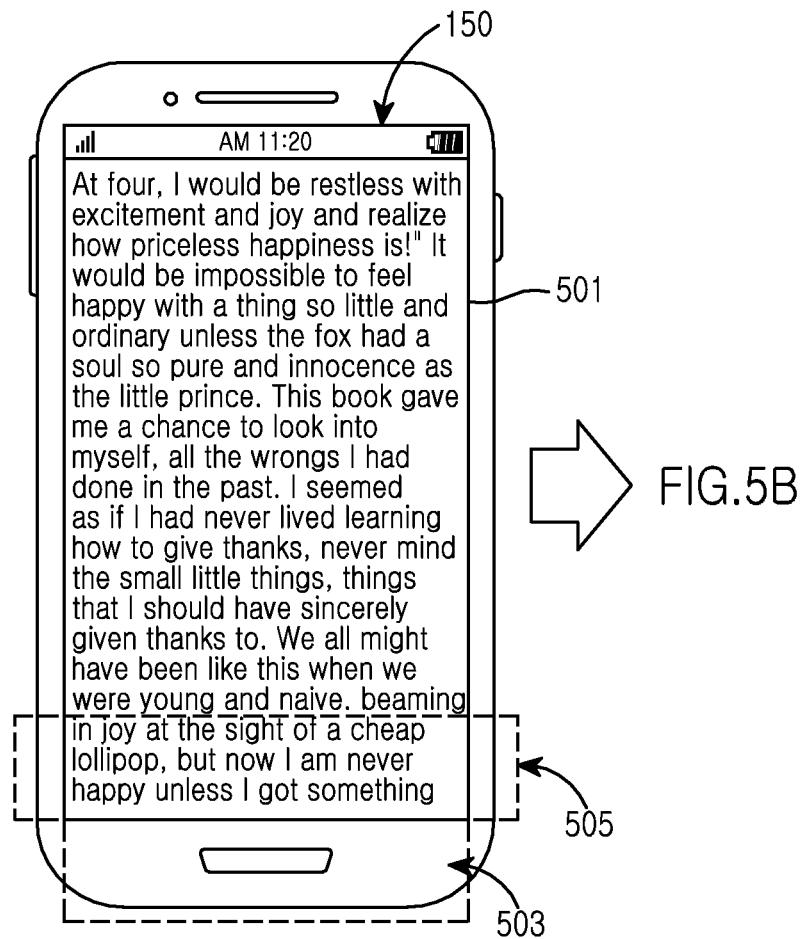
Figure 6A:
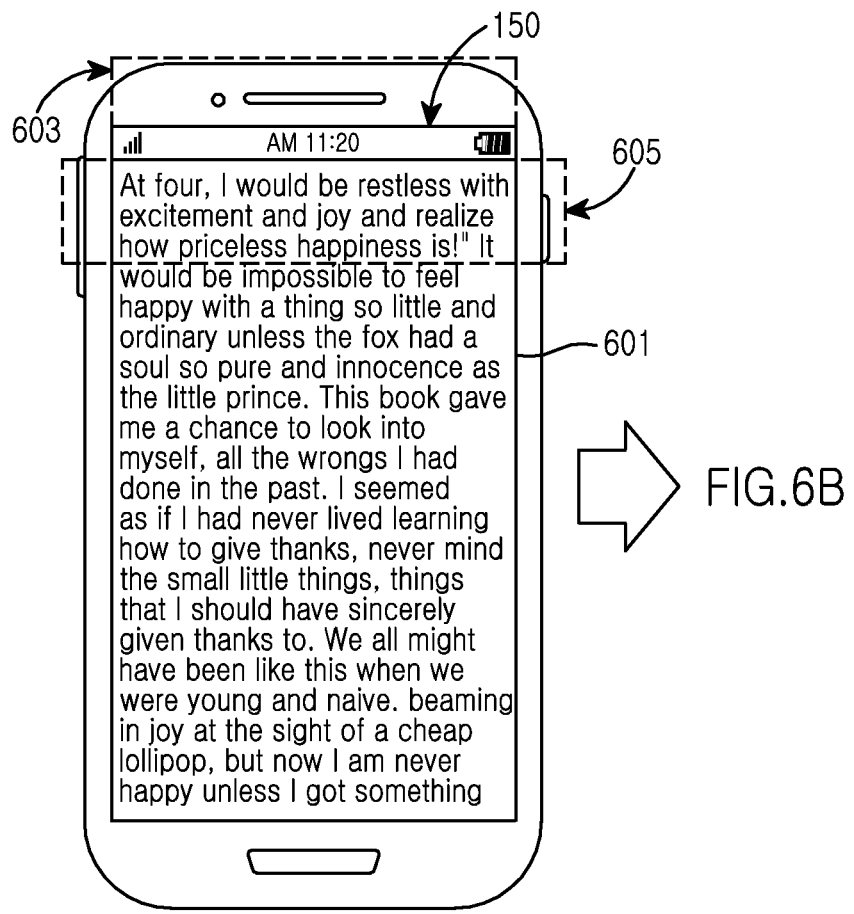
Figure 7A:
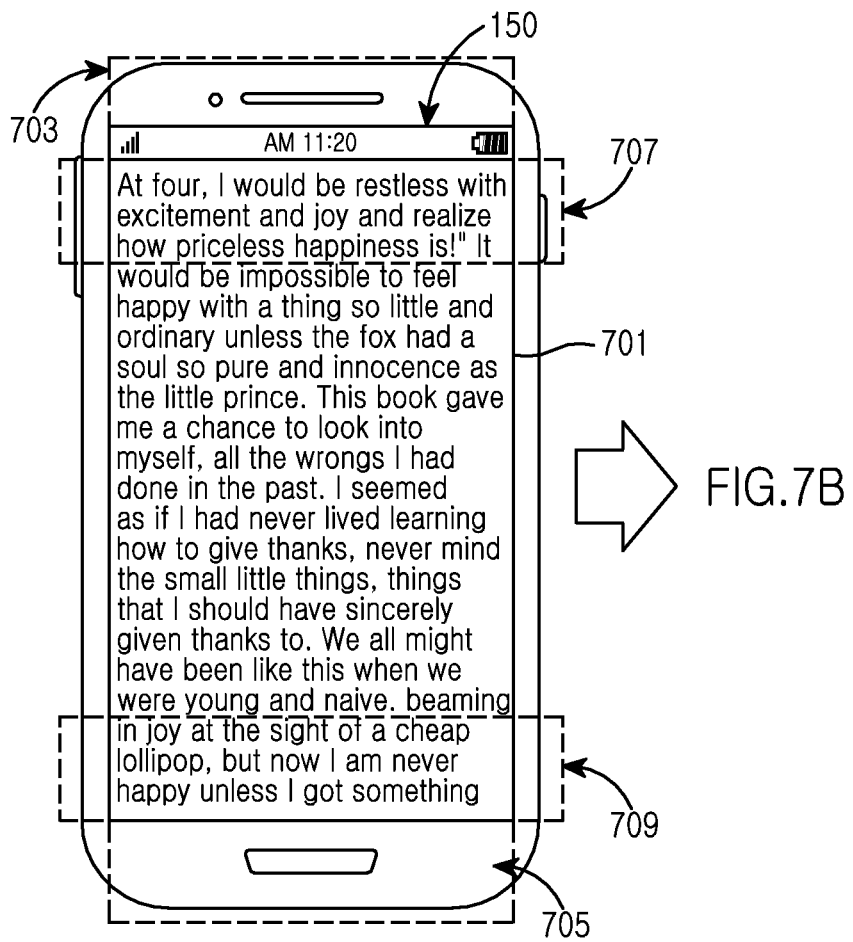

Referring to FIG. 3, the electronic device 100 identifies at least one object which should be displayed in a display area of the display unit 150, at step 301. The object may include all objects such as images or text which can be displayed on the display unit. As illustrated in FIGS. 5A, 6A, and 7A, the electronic device 100 identifies whether the contents of "news" displayed in display areas 501, 601, and 701 are all displayed. The electronic device 100 identifies whether the contents of "news" which are not displayed in the display areas 501, 601, and 701 exist.

At step 303, the electronic device converts display attributes of the object. As illustrated in FIGS. 5A-7B, the electronic device 100 displays reference areas 505, 605, 707, and 709 in a curved or flipped manner in order to display contents 503, 603, 703, and 705 of "news" which are not displayed, as indicated by reference numerals 511, 611, 711, and 713. When it is assumed that the reference area exists in a 3D space, the electronic device 100 displays the reference area in the curved or flipped manner by using at least one method of perspective projection and orthographic projection. The electronic device 100 applies different shades to at least one object which should be displayed in a display area of the display unit 150 according to a curved angle according to a curved angle.

When contents are text, the electronic device 100 changes a text display parameter and displays text which is not displayed in the display area. The text display parameter may include at least one of a size, an interval, and a width of the text. When text includes a plurality of lines, the electronic device 100 inserts an interval between lines into the text display parameter.

The electronic device 100 changes attributes of the object which is not displayed in the display area and thus displays more objects than before the attributes of the object were changed. The electronic device 100 changes attributes of the object which is displayed in the display area and thus displays more objects than before the attributes of the object were changed. The electronic device 100 changes attributes of the object which is displayed in the display area and attributes of the object which is not displayed in the display area and thus displays more objects than before the attributes of the object were changed.

Figure 4:
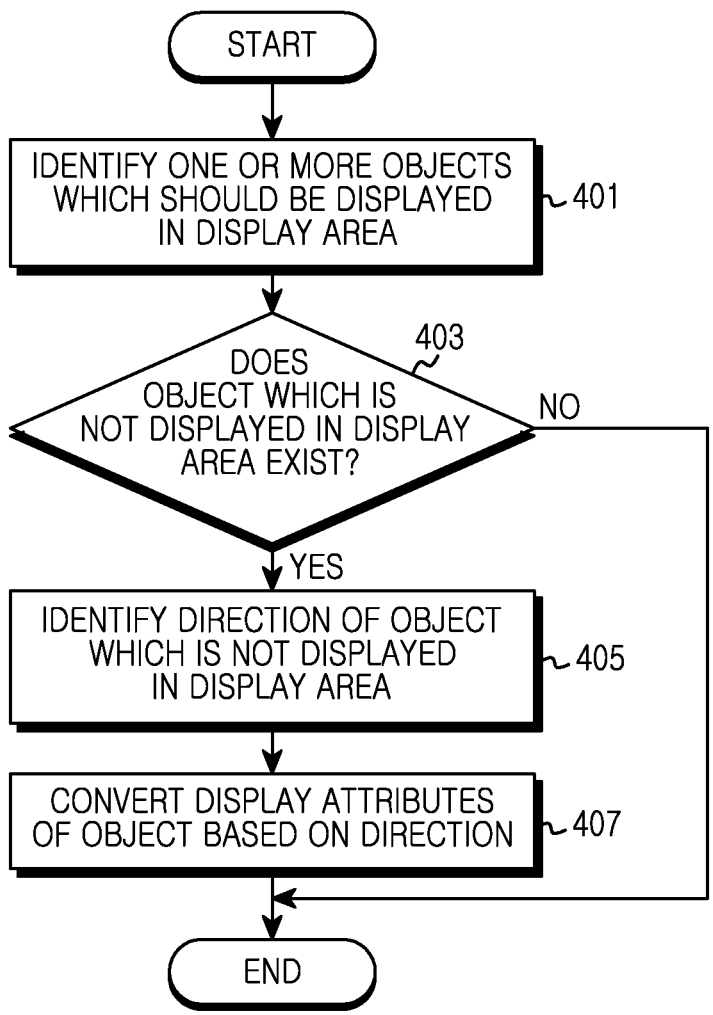
FIG. 4 is a flowchart illustrating a process for converting display attributes of objects based on directions of at least some objects which are not displayed in a display area, according to an embodiment of the present invention.

FIG. 4 is a flowchart illustrating a process for converting display attributes of objects by the electronic device 100 based on directions of at least some objects which are not displayed in a display area, according to an embodiment of the present invention.

Referring to FIG. 4, the electronic device 100 identifies at least one object which should be displayed in a display area of the display unit 150, at step 401. The object may include all objects such as images or text which can be displayed on the display unit. As illustrated in FIGS. 5A to 7B, when a text display event is generated in display areas 501, 601, or 701, the electronic device 100 identifies text which should be displayed in the display areas 501, 601, or 701.

At operation 403, the electronic device 100 identifies whether an object which is not displayed in the display area exists. The electronic device 100 identifies whether text which is not displayed in the display area 501, 601, or 701 exists.

When the object which is not displayed in the display area exists, the electronic device 100 identifies a direction of the object which is not displayed in the display area, at step 405. As illustrated in FIG. 5A, the contents of "news" which are not displayed in the display area 501 may exist in a lower end 503 based on the display area 501. As illustrated in FIG. 6A, the contents of "news" which are not displayed in the display area 601 may exist in an upper end 603 based on the display area 601. As illustrated in FIG. 7A, the contents of "news" which are not displayed in the display area 701 may exist in an upper end 703 and a lower end 705 based on the display area 701. Although not illustrated, the object which is not displayed in the display area may exist at the left side, right side, or left and right sides of the electronic device 100. Although not illustrated, the object which is not displayed in the display area may exist in at least two directions of the upper end, lower end, right side, and left side of the electronic device 100.

Figure 5B:
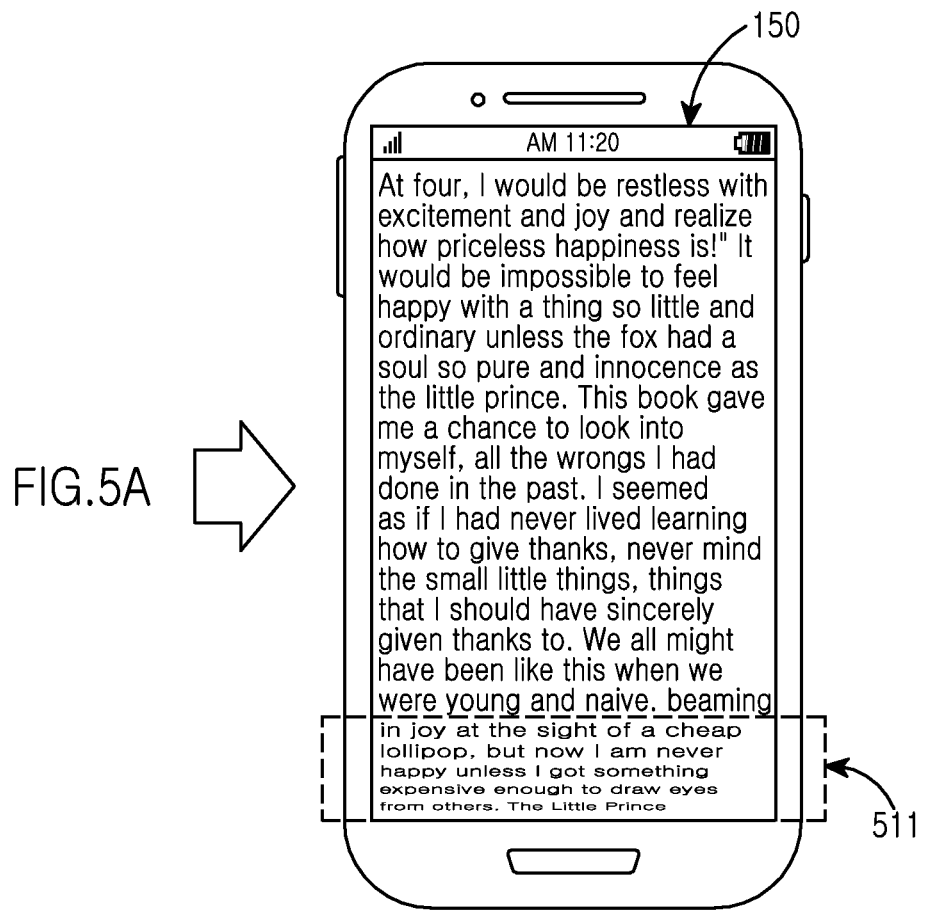
Figures 6A, 6B:
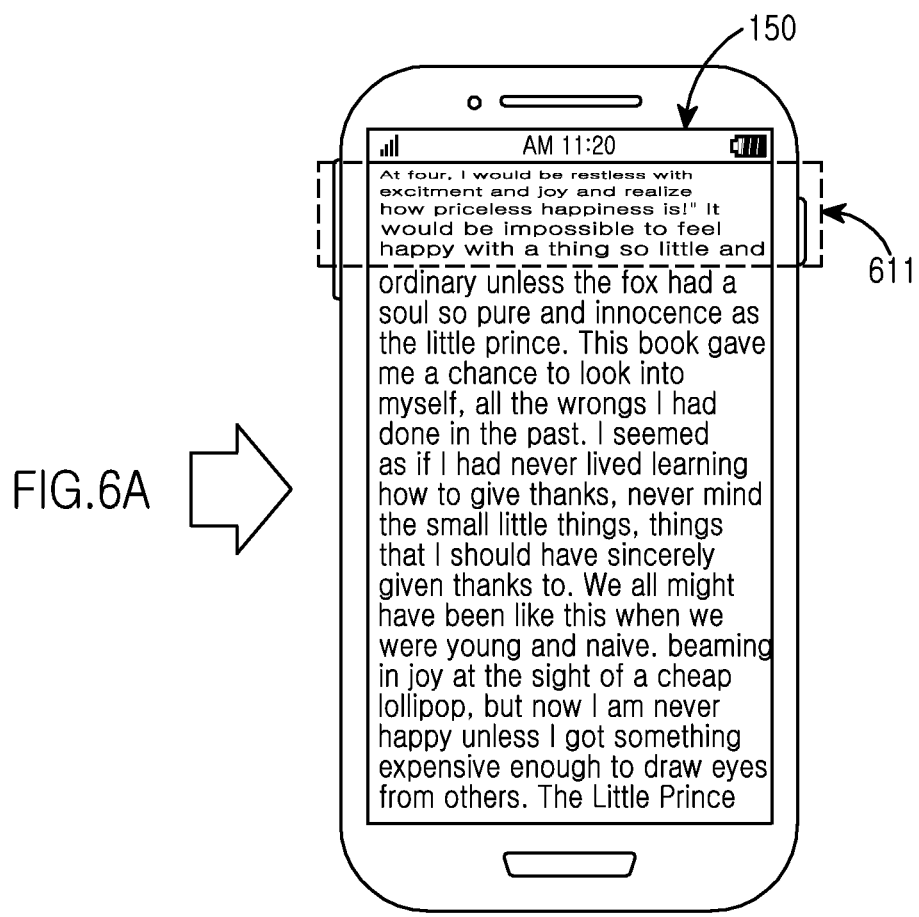
Figures 7A, 7B:
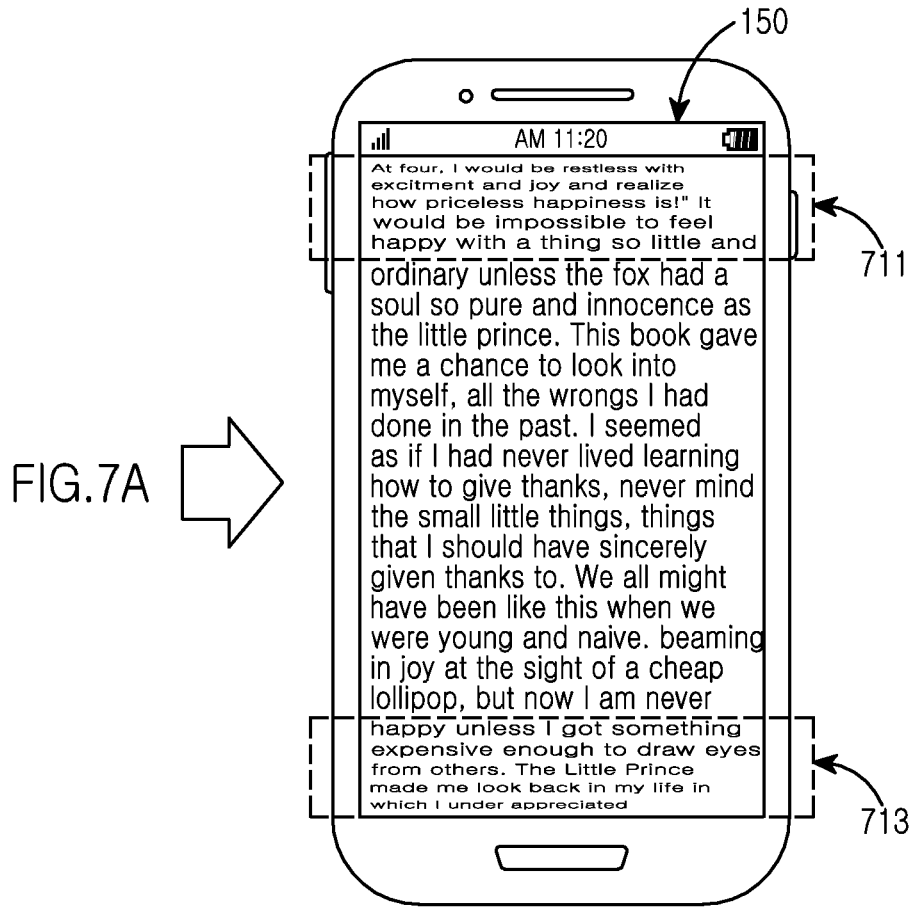

At step 407, the electronic device 100 converts display attributes of the object based on a direction of the object which is not displayed in the display area. For example, as illustrated in FIGS. 5A and 5B, when the contents of "news" which are not displayed in the display area 501 exist in the lower end 503 of the display area 501, the electronic device 100 displays the reference area 505 in a curved or flipped manner in order to display the contents of "news" which are not displayed, as indicated by reference numeral 511. As illustrated in FIGS. 6A and 6B, when the contents of "news" which are not displayed in the display area 601 exist in the upper end 603 based on the display area 601, the electronic device 100 displays the reference area 605 in a curved or flipped manner in order to display the contents of "news" which are not displayed, as indicated by reference numeral 611. As illustrated in FIGS. 7A and 7B, when the contents of "news" which are not displayed in the display area 701 exist in the upper end 703 and the lower end 705 based on the display area 701, the electronic device 100 displays the reference areas 707 and 709 in a curved or flipped manner in order to display the contents of "news" which are not displayed as indicated by reference numerals 711 and 713.

When it is assumed that the reference area exists in a 3D space, the electronic device 100 displays the reference area in a curved or flipped manner by using at least one method of perspective projection and orthographic projection. The electronic device 100 applies different shades to the reference area according to a curved angle.

When contents are text, the electronic device 100 changes a text display parameter and displays the text which is not displayed in the display area. The text display parameter includes at least one of a size, an interval, and a width of the text. When text includes a plurality of lines, the electronic device 100 inserts an interval between lines into the text display parameter.

The electronic device 100 changes attributes of the object which is not displayed in the display area and displays more objects than before the attributes of the object were changed. The electronic device 100 changes attributes of the object which is displayed in the display area and thus displays more objects than before the attributes of the object were changed. The electronic device 100 changes attributes of the object which is displayed in the display area and attributes of the object which is not displayed in the display area and thus displays more objects than before the attributes of the object were changed.

As illustrated in FIGS. 8A to 10B, in order to display at least some images which are not displayed in the display area, the electronic device 100 changes a display area of the image.

Figure 8A:
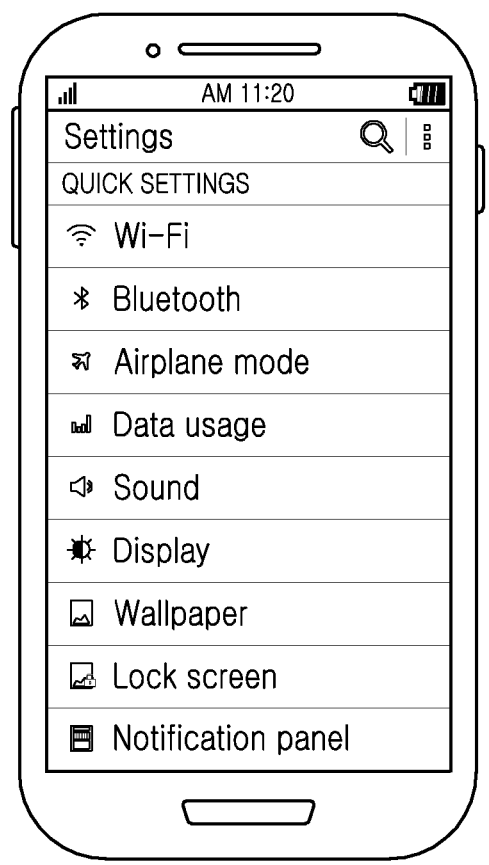
Figure 8B:
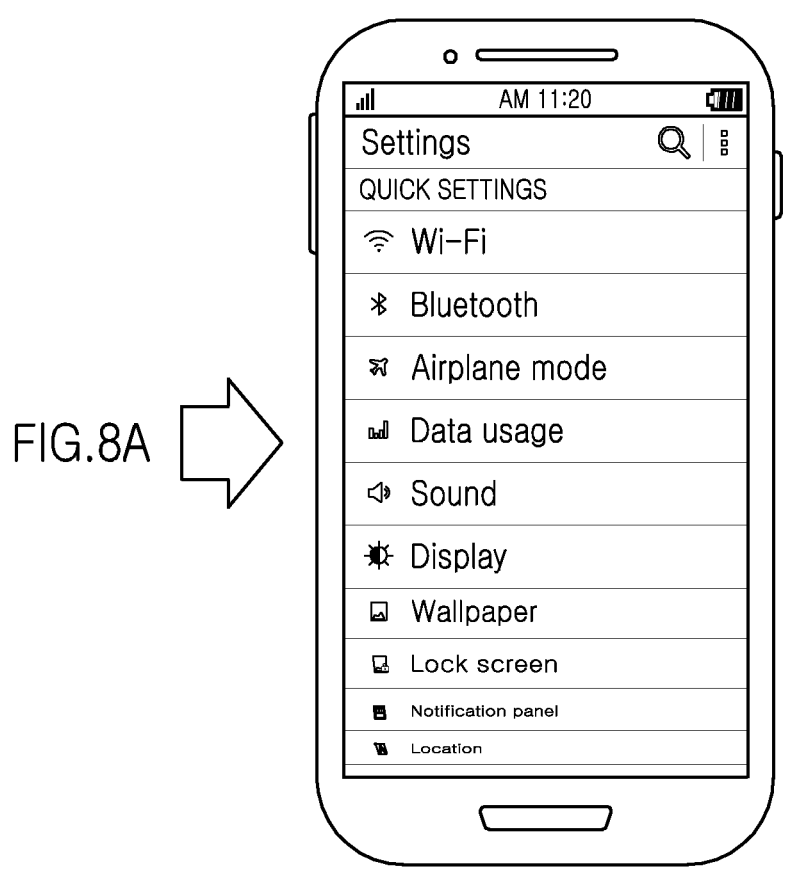

When it is recognized that at least some menus which are not displayed in an "environment setting list," as illustrated in FIG. 8A, exist, the electronic device 100 converts display attributes of menu images as illustrated in FIG. 8B, to display menus which have not been displayed in FIG. 8A. The electronic device 100 changes attributes of menus which are not displayed in the "environment setting list" and thus displays more menus than before the attributes were changed. The electronic device 100 changes attributes of menus which are displayed in the "environment setting list" and thus displays more menus than before the attributes were changed. The electronic device 100 changes attributes of menus which are displayed in the "environment setting list" and attributes of menus which are not displayed in the "environment setting list" and thus displays more menus than before the attributes were changed.

Figure 9A:
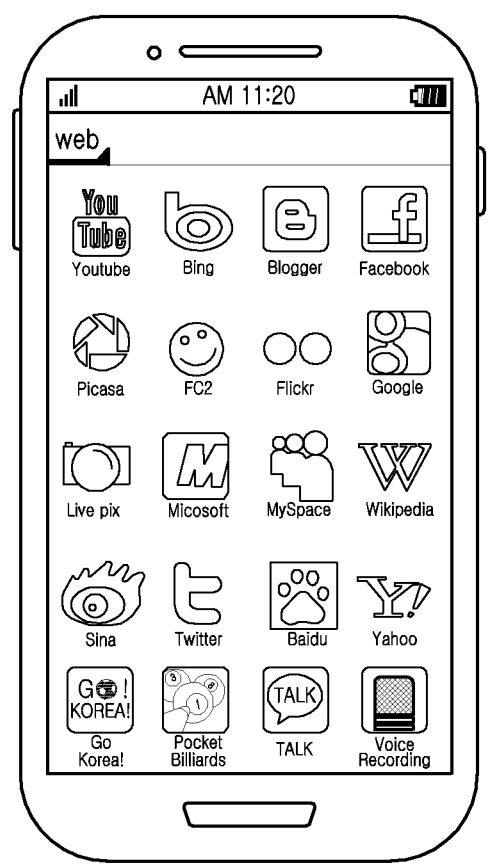
Figure 9B:
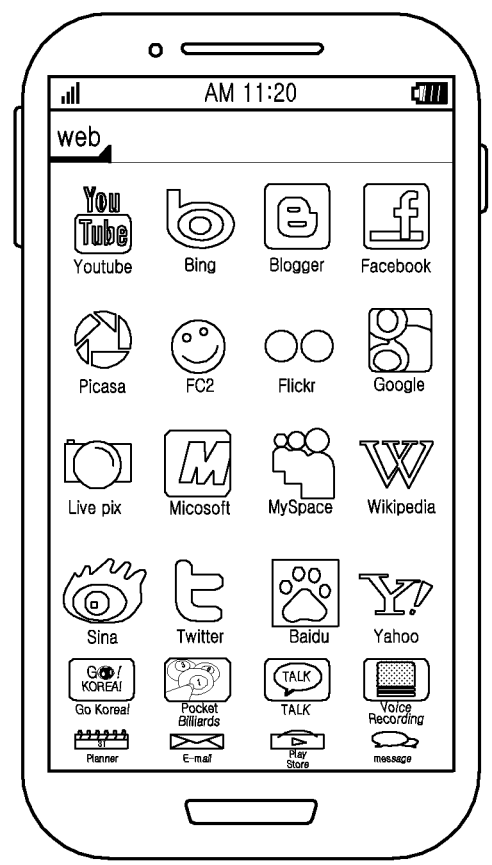

When it is recognized that at least some icons which are not displayed in an "application list," as illustrated in FIG. 9A, exist, the electronic device 100 converts display attributes of some application icons, as illustrated in FIG. 9B, to display application icons which have not been displayed in FIG. 9A. The electronic device 100 changes attributes of application icons which are not displayed in the "application list" and thus displays more menus than before the attributes were changed. The electronic device 100 changes attributes of application icons which are displayed in the "application list" and thus displays more menus than before the attributes were changed. The electronic device 100 changes attributes of application icons which are displayed in the "application list" and attributes of application icons which are not displayed in the "application list" and thus displays more menus than before the attributes were changed.

When it is recognized that at least some menu items which are not displayed in an "Internet list," as illustrated in FIG. 10A, exist, the electronic device 100 converts display attributes of images of some menu items, as illustrated in FIG. 10B, to display menu items which have not been displayed in FIG. 10A. The electronic device 100 changes attributes of menu items which are not displayed in the "Internet list" and thus displays more menu items than before the attributes were changed. The electronic device 100 changes attributes of menu items which are displayed in the "Internet list" and thus displays more menu items than before the attributes were changed. The electronic device 100 changes attributes of menu items which are displayed in the "Internet list" and attributes of menu items which are not displayed in the "Internet list" and thus displays more menu items than before the attributes were changed.

Although not illustrated, the electronic device 100 may change display attributes of images based on directions of some images which are not displayed in the display area according to one embodiment.

According to various embodiments, a method of displaying an object by an electronic device may include: identifying one or more objects which should be displayed in a display area; and, when at least some of the one or more objects cannot be displayed in the display area, changing display attributes of the one or more objects and displaying the objects in the display area.

According to various embodiments, the changing of the display attributes of the one or more objects may include displaying at least some of the one or more objects to be curved.

According to various embodiments, the displaying of at least some of the one or more objects to be curved may include displaying at least some of the one or more objects to be curved based on at least one method of perspective projection and orthographic projection.

According to various embodiments, the displaying of at least some of the one or more objects to be curved may include applying a shade based on a displayed curved angle.

According to various embodiments, when the objects correspond to text, the changing of the display attributes of the one or more objects may include changing at least one of a size, interval, and width of the text.

According to various embodiments, the method may further include: identifying directions of at least some of the one or more objects which are not displayed in the display area; and changing display attributes of the one or more objects based on the directions.

According to various embodiments, the changing of the display attributes of the one or more objects may include changing display attributes of one or more objects which are displayed in the display area.

According to various embodiments, the changing of the display attributes of the one or more objects may include changing display attributes of at least some of the one or more objects which are not displayed in the display area.

As described above, when at least some objects which are not displayed in the display area of the electronic device 100 exist, the number or areas of objects which can be displayed in the display area can be increased by changing display attributes of the objects.

The methods described herein may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device 100. The one or more programs may include instructions for allowing the electronic device 100 to perform the methods described herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, the programs may be stored in a memory configured by a combination of some or all of the listed components. Further, a plurality of configuration memories may be included.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. The storage device may access the electronic device through an external port.

Various exemplary embodiments for describing the present i may be performed by using one or more programs included in the memory 110 of the electronic device 100, or may be directly controlled by a processor (e.g., the processor 122). In addition, the embodiments described herein may also be controlled by using one or more control modules. And the one or more control modules may be controlled by the processor 122.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A method of displaying an object by an electronic device, the method comprising:
   identifying one or more objects for displaying in a display area of the electronic device; and
   when at least one of the one or more objects cannot be displayed in the display area, changing display attributes of the one or more objects and displaying the one or more objects in the display area,
   wherein changing the display attributes comprises at least one of displaying the at least one of the one or more objects in a curved manner,
   wherein one object in a curved manner is spaced apart from another object in a curved manner, and
   wherein the curved manner comprises a gradual reduction in size and interval.

2. The method of claim 1, wherein displaying the at least one of the one or more objects in the curved manner is based on at least one of a perspective projection method and orthographic projection method.

3. The method of claim 1, wherein displaying the at least one of the one or more objects in the curved manner comprises applying a shade to the one or more objects in the curved manner based on a displayed curved angle.

4. The method of claim 1, wherein, when the one or more objects correspond to text, changing the display attributes of the one or more objects comprises changing at least one of a size, an interval, and a width of the text.

5. The method of claim 1, further comprising:
   identifying directions of the at least one of the one or more objects which are not displayed in the display area; and
   changing display attributes of the one or more objects based on the identified directions.

6. The method of claim 1, wherein changing the display attributes of the one or more objects comprises changing display attributes of one or more objects which are displayed in the display area.

7. The method of claim 1, wherein changing the display attributes of the one or more objects comprises changing display attributes of at least one of the one or more objects which are not displayed in the display area.

8. An electronic device for displaying an object, the electronic device comprising:
   one or more processors configured to identify one or more objects for displaying in a display area of the electronic device and change display attributes of the one or more objects and display the one or more objects in the display area when at least one of the one or more objects cannot be displayed in the display area,
   wherein changing the display attributes comprises at least one of displaying the at least one of the one or more objects in a curved manner,
   wherein one object in a curved manner is spaced apart from another object in a curved manner, and
   wherein the curved manner comprises a gradual reduction in size and interval.

9. The electronic device of claim 8, wherein the one or more processors are further configured to display the at least one of the one or more objects in the curved manner based on at least one of perspective projection method and orthographic projection method.

10. The electronic device of claim 8, wherein the one or more processors are further configured to apply a shade to the one or more objects in the curved manner based on a displayed curved angle.

11. The electronic device of claim 8, wherein, when the one or more objects correspond to text, the one or more processors changes at least one of a size, an interval, and a width of the text.

12. The electronic device of claim 8, wherein the one or more processors are further configured to identify directions of the at least one of the one or more objects which are not displayed in the display area and change display attributes of the one or more objects based on the identified directions.

13. The electronic device of claim 8, wherein the one or more processors are further configured to change display attributes of the one or more objects which are displayed in the display area.

14. The electronic device of claim 8, wherein the one or more processors are further configured to change display attributes of at least one of the one or more objects which are not displayed in the display area.

15. A nontransitory computer-readable recording medium for storing commands and recording a program for executing operations, the operations comprising:
   identifying one or more objects for displaying in a display area of the electronic device; and
   when at least one of the one or more objects cannot be displayed in the display area, changing display attributes of the one or more objects and displaying the one or more objects in the display area,
   wherein changing the display attributes comprises at least one of displaying the at least one of the one or more objects in a curved manner,
   wherein one object in a curved manner is spaced apart from another object in a curved manner, and wherein the curved manner comprises a gradual reduction in size and interval.

* * * * *